Aug. 18, 1931. J. BEHLE 1,819,353
RIB GRINDING MACHINE
Filed Oct. 29, 1929 7 Sheets-Sheet 5

Inventor
Joseph Behle.
By Jack A. Schley
Attorney

Patented Aug. 18, 1931

1,819,353

UNITED STATES PATENT OFFICE

JOSEPH BEHLE, OF DALLAS, TEXAS, ASSIGNOR TO THE MURRAY COMPANY, OF DALLAS, TEXAS, A CORPORATION OF TEXAS

RIB GRINDING MACHINE

Application filed October 29, 1929. Serial No. 403,269.

This invention relates to a grinding machine, and particularly to a construction adapted to grind or finish the sides of a gin saw rib and embodying a carrier mounted to reciprocate between a pair of grinding wheels and supporting the work, and a form to guide said carrier in an irregular path intermediate the spaced peripheries of the grinding wheels.

In such grinding of an irregular or curved object, it has been found important to properly adjust the work relative to the grinding wheels so that when guided by a form moving with the work carrier the work will be held in horizontal alignment with the centers of the grinding wheels. In order to assume the proper width of cut at different portions of the work, the grinding wheels are guided by a form moving with the work carrier.

The invention has for an object to provide a novel and improved construction of grinding machine including grinding wheels yieldingly mounted and carrying guide arms, and a work carrier mounted for longitudinal movement between the grinding wheels and for movement vertically of the axes thereof.

A further object of the invention is to provide an improved carrier mechanism consisting of a work holder and guide forms mounted for movement at an angle to the carriage travel on the machine frame, a grinding wheel and guide arm cooperating with said holder and forms, and driving means for reciprocating the carriage and forms longitudinally of the frame.

And a still further object of the invention is to provide means for adjusting the grinding elements whereby they may be constantly maintained in spaced relation to assure the grinding of the body of all ribs to the same width and effecting a further separation of the elements when aligned with the feet at opposite ends of the rib.

Other and further objects and advantages of the invention will be hereinafter set forth and the novel features thereof defined by the appended claims.

In the drawings, which illustrate one form of the invention.

In the drawings, the numeral 10 designates side standards upon which are mounted arched uprights 11 and 12 at the forward and rear ends thereof for supporting longitudinal shafts 13. Intermediate these standards are a series of cross beams 14 forming supports for parts of the mechanism.

Figure 2:
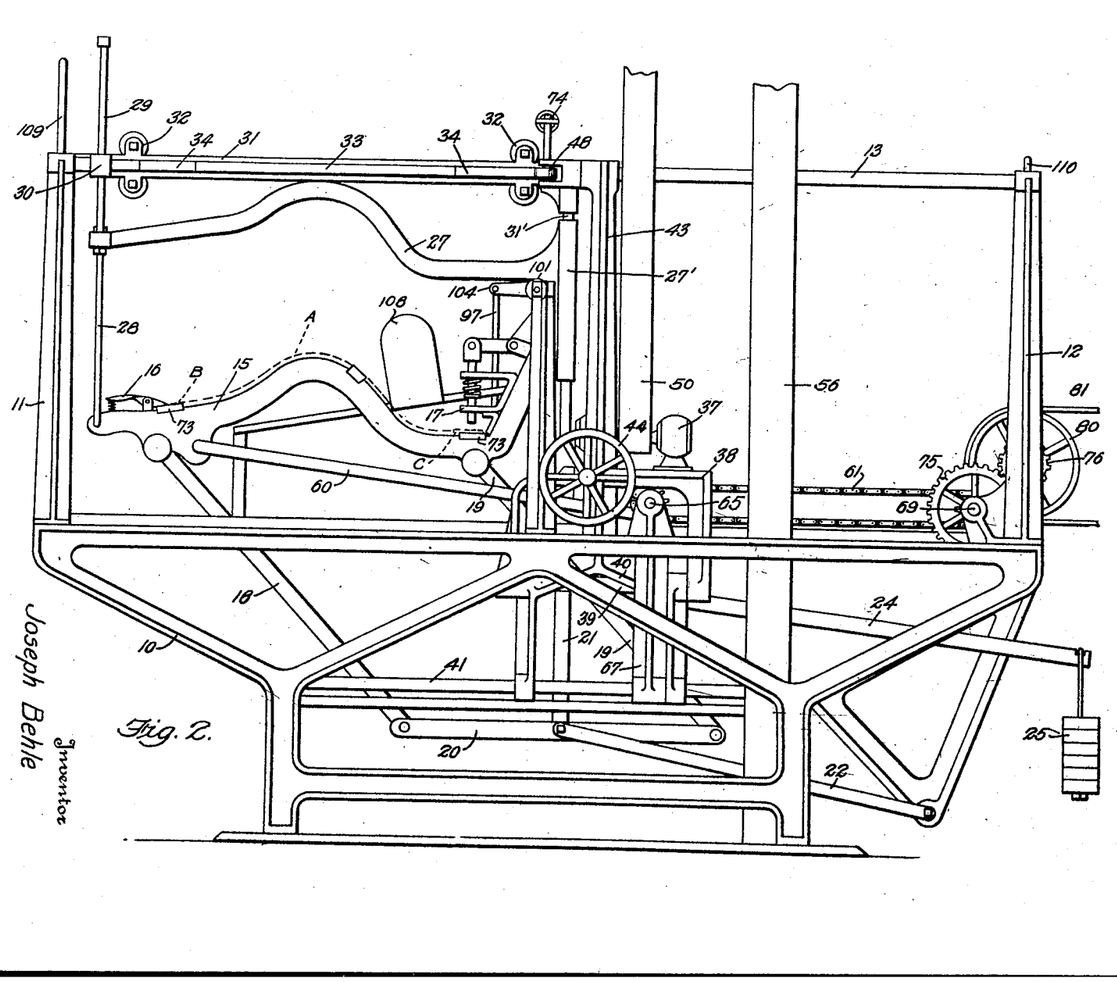
Fig. 2 is a side elevation thereof from the right.
Figures 10, 11:
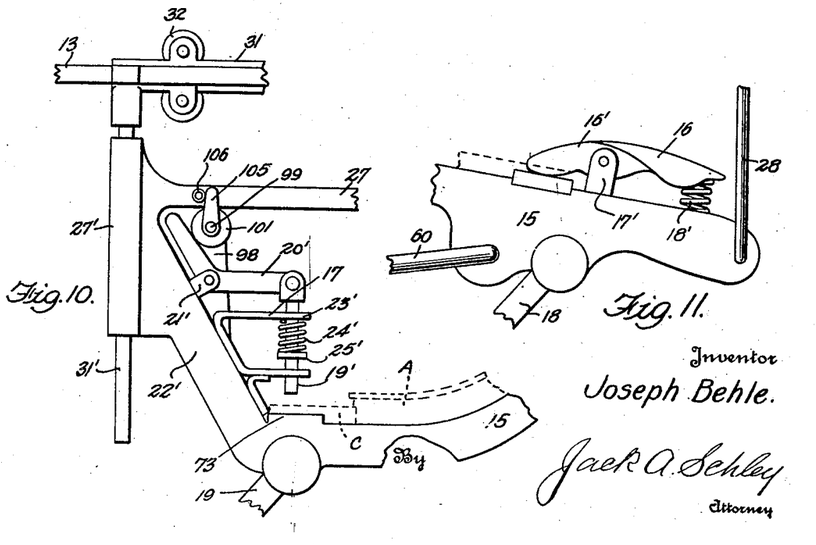
Fig. 10 is an enlarged vertical section of the work grip at one end of the work holder.
Fig. 11 is an enlarged vertical section of the work grip at the opposite end of the work holder.

A duplicated pair of rib holders or carriers 15 and 15' are shown, but one may be used and each is provided with work grips 16 and 17 at their opposite ends for receiving thereon a gin rib A by means of its feet B and C, as shown in Figs. 2, 10 and 11.

Each carrier has a pair of spaced ears 72 secured to the sides near the center and at the top thereof for bracing and holding the rib laterally on said carrier. Also each carrier is provided with spaced shoes 73 at each end for receiving the feet B and C of the rib, as shown in Figs. 14, 15, 16 and 17.

The work grips 16 are located at the forward end of the carriers and comprise a lever 16' hinged in a bracket 17', with a spring 18' confined between the carrier and the forward end of the lever, said end having a broad face for convenience in operating by hand, as shown in Fig. 11.

The work grips 17 are located at the rear of the carriers and comprise a plunger 19' pivoted to one end of a double arm lever 20' hinged in a yoke 21' mounted on the extended rear end 22' of the work carrier. The plunger extends through the arms of a yoke bracket 23' and has a spring 24' disposed circumferentially and confined thereon by a washer 25' and the upper arm of the bracket 23'. The downward tension of the spring upon the plunger causes said plunger to grip the foot C of the rib A.

Figures 18, 19:
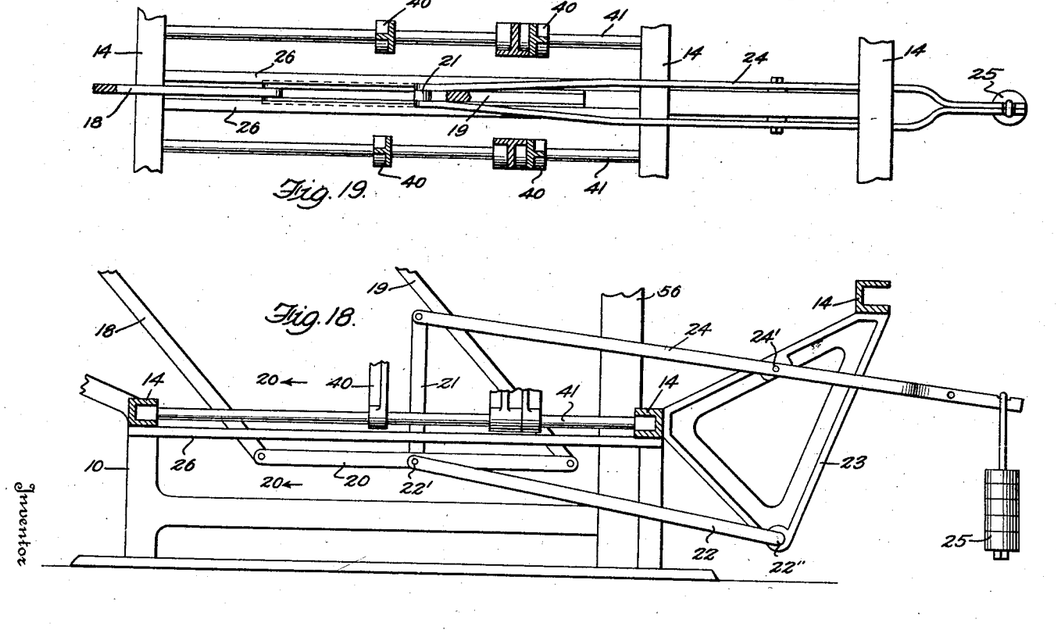
Fig. 18 is a sectional elevation of the work carrier and counter-balance.
Fig. 19 is a plan view of the same.
Figure 20:
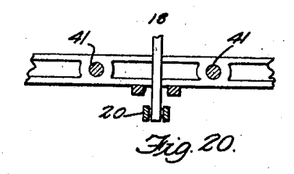
Fig. 20 is a cross sectional view taken on line 20—20 of Fig. 18.

The work carriers are mounted upon counter-balanced supports, each comprising legs 18 and 19 hinged at the forward and rear ends of the carriage with their opposite ends hinged between the opposite ends of a pair of horizontal bars 20. The bars are pivotally suspended at their centers by a vertical member 21 which in turn is suspended from a yoke lever 24. Said lever is pivoted at 24' intermediate its ends to a triangular support 23. The lever is mounted intermediate the upper rear and lower rear cross beams 14 and has a counter weight 25 hung from its rear end to partially counterbalance the weight of the work carrier and permit the form 27 to ride on roller 101. The connecting bars 22 have their forward ends pivoted at 22' to the center and on each side of the horizontal bar 20 and their opposite ends pivoted at 22'' to the bottom of the triangular support 23.

A pair of guide bars 26 have their opposite ends secured to the lower front and lower rear cross beams and confine the legs 18 and 19 and the vertical member 21 of each counter-balance support thereby forming a brace and longitudinal guide for said support.

Figure 1:
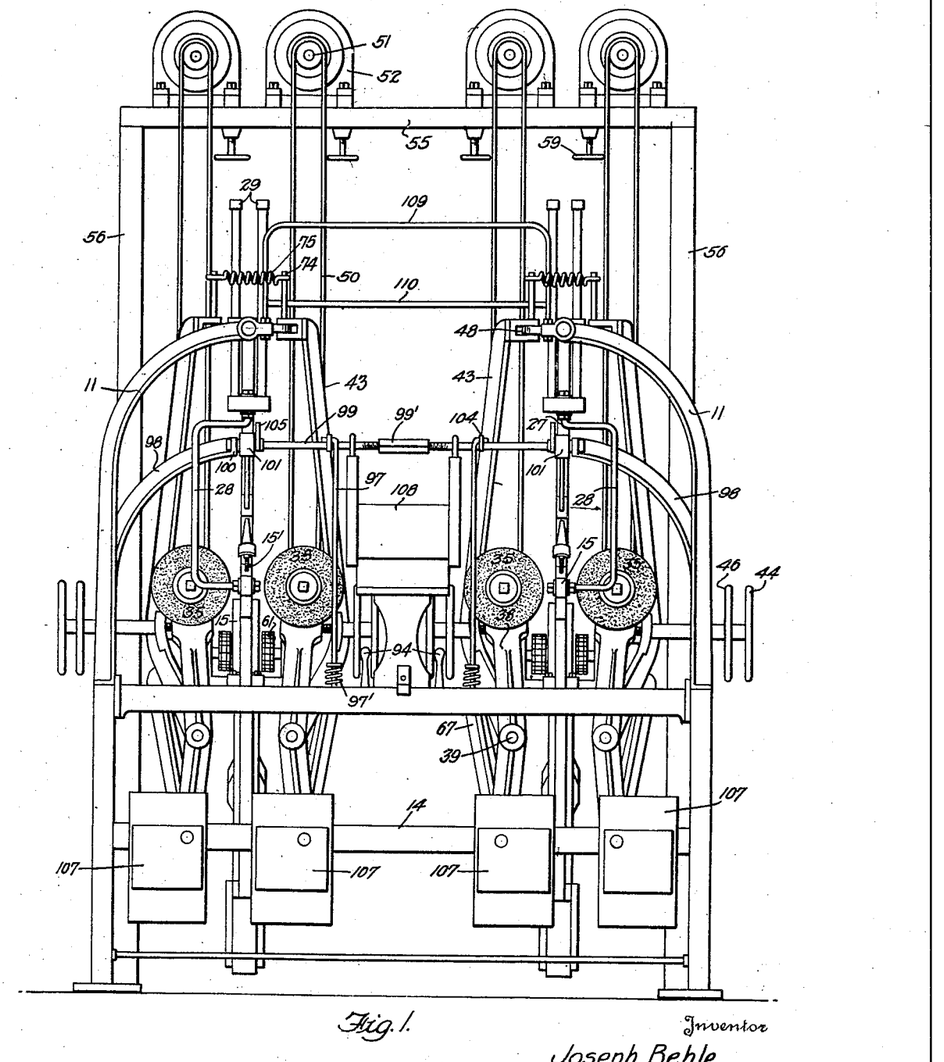
Fig. 1 is a front elevation of the machine.

Immediately above each of the work carriers 15, 15' a master guide form 27 is mounted and is supported by means of a rod 28 at the forward end and by means of a rigid connection of both of the rear ends of the master form and the carrier to an elongated bearing 27'. Thus a rigid unit is formed of each of the master guide forms and the work carriers. The rod 28 is deflected laterally to provide a clearance space, shown in Fig. 1.

Attached to the forward end of each master form 27 are two vertical bars 29 which slide in bearings 30 at the forward end of carriages 31. Said carriages are disposed circumferentially of the shafts 13 and are supported thereon by rollers 32 on the top and bottom at each end of the carriage. The faces of the rollers 32 are curved to conform with the surface of the shafts 13.

A vertical shaft 31' depends from the rear of each carriage 31 and through the bearing 27'. Thus the shaft 29 and bearing 27' provide for longitudinal reciprocation of the carriage 31 in cooperation with the longitudinal and vertical reciprocation of the work carrier.

Center arched uprights 98 mounted on each of the side standards 10 support a shaft 99 in bearings 100 at the upper end of said uprights. Rollers 101 are mounted on the shaft 99 adjacent the bearings for supporting the master guide forms 27 which travel thereon to permit the gaged vertical displacement of the carriers during their longitudinal reciprocation. The shaft 99 is cut at the center and loosely threaded in a turnbuckle 99' thereby allowing each end to turn separately, see Fig. 1.

For guiding the sides of the ribs, grinding wheels 35 of carborundum, or any other suitable material, are mounted adjacent each carrier. Each wheel is mounted upon an arbor 36 which in turn is mounted in a bearing box 37 fastened on a yoke 38 hinged on a pin 39 carried by a yoke-shaped bracket 40. Said bracket is hinged on a shaft 41 secured longitudinally of the frame as a whole intermediate the lower cross beams 14'.

Figures 8, 9:
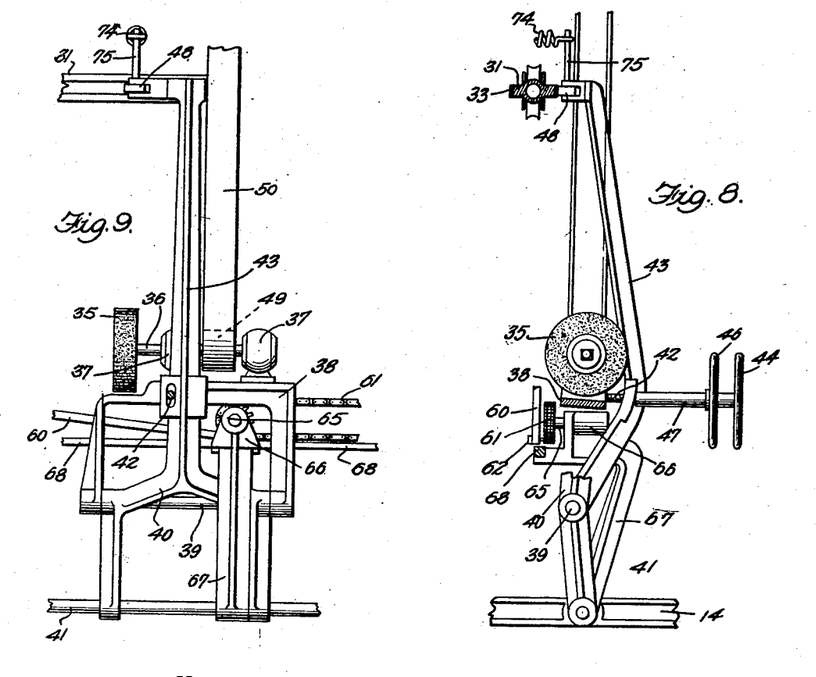
Fig. 8 is a vertical section showing the mounting of one of the grinding wheels and the guide and adjusting means thereof.
Fig. 9 is a side view of the same.

As is best shown in Figs. 8 and 9, the yokes 38 are held in position and adjusted by means of screws 42, one of which is threaded into each yoke and extending outwardly and loosely through an arm 43 projecting upwardly and outwardly from the yoke bracket 40. Each screw has an adjusting wheel 44 fastened on its outer end and carries a locking wheel 46, the hub of which is adapted to engage a loose sleeve 47 disposed circumferentially of the screw and confined thereon intermediate the hub and the arm 43, which in turn is adapted to engage said arm and lock the yoke 38 in position. By adjusting and fastening the yokes the grinding wheels 35, which are at a right angle to the carriers, are held in proper position and are correctly spaced to grind the sides of the ribs and thus gage each rib as to its width.

Rollers 48 mounted at the upper end of the arms 43 ride against faces 33 on both sides of the carriages 31. The rollers are held against the carriages by the tension of a spring 74 that is secured intermediate pins 75 extending from the top of the arms 43 which are on opposite sides of the shafts 13. The faces 33 have bosses 34 so positioned at the opposite ends that when said bosses are engaged by the rollers the grinding wheels are displaced outwardly allowing for the clearance of the rib feet B and C when said feet pass between the grinding wheels.

Figure 21:
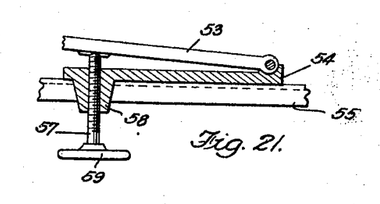
Fig. 21 is a detail of the drive belt tightening device.

The grinding wheels are separately driven, and each arbor 36 has mounted thereon a pulley 49 driven by a belt 50, which in turn is driven by a pulley 51 mounted on the armature shaft of an electric motor 52. Each electric motor is mounted on a swing base 53 pivoted at one end to a base plate 54 secured on a lintel 55 of a frame 56. The opposite end of each swing base 53 is supported on the upper end of a vertical adjusting screw 57 threaded in a boss 58 carried by the base plate 54 and depending through the lintel 56, as is best shown in Fig. 21. Each screw 57 has a hand wheel 59 for adjusting the screw whereby the base 53 may be raised or lowered to tighten or loosen the belt.

For reciprocating the work carriers between the grinding wheels, drive bars 60 are pivoted at their forward ends to each side of the forward portion of the work carriers, and each bar has its rear end connected to a link of an endless chain 61 by means of a pin 62. Each chain is mounted on two sprockets 63 and 64 which have a distance between their centers equal to the length of the work travel, thus providing for the complete reciprocation of the full length of the work between the grinding wheels. Each sprocket 63 is mounted on an arbor 65 journaled in a bearing 66 of a standard 67 mounted on the shaft 41, Figs. 8 and 9. Longitudinal bars 68 are mounted intermediate the upper front and the upper rear beams 14 and are attached to the standards 67 thus serving to brace said standards and also serving as a brace for the legs 18 and 19 which ride in between the bars 68.

The sprockets 64 of the two chains which drive the carrier 15 are mounted on shafts 69 journaled in bearings 70 of double bearing brackets 71. Said brackets 71 are mounted on the upper rear cross beam 14.

Figure 3:
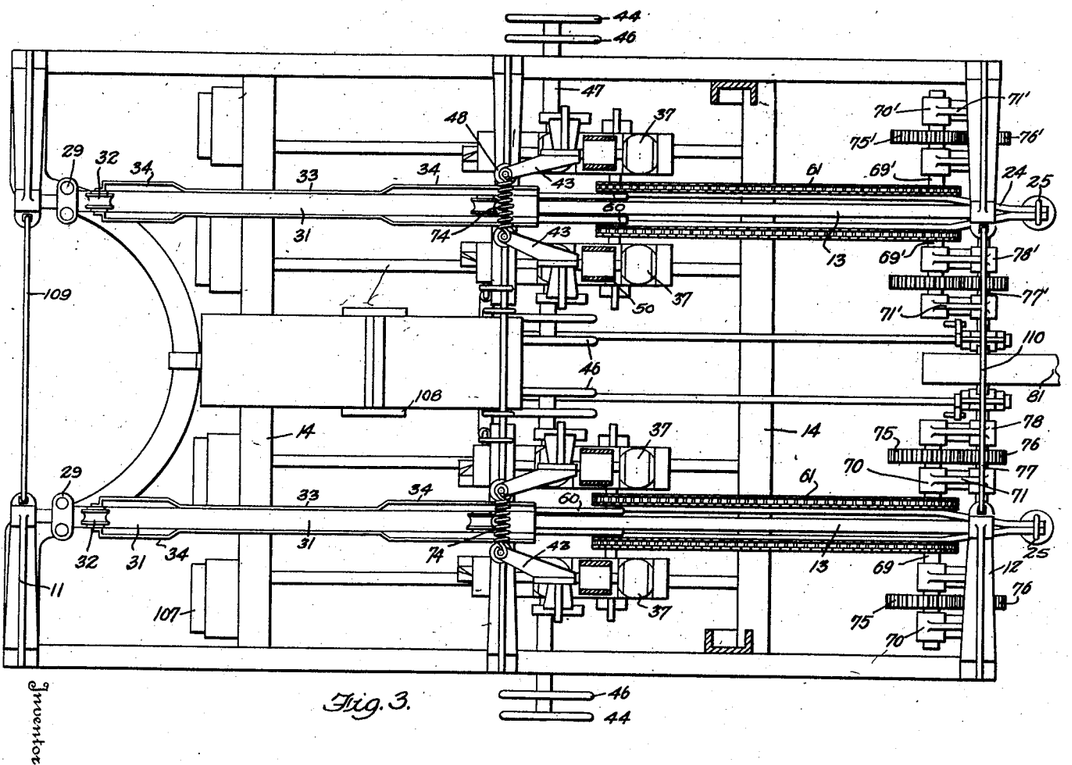
Fig. 3 is a top plan view with the upper sill removed.
Figure 4:
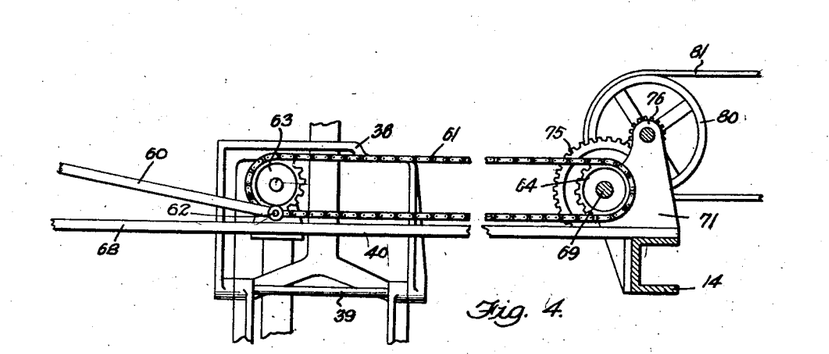
Fig. 4 is a vertical section of the carrier driving means.

Gears 75 are mounted on the shaft 69 and are meshed with pinions 76 mounted on a drive shaft 77 which is journaled in bearings 78 of the brackets 71, Fig. 3.

The sprockets 64 of the two chains which drive the carrier 15' are mounted on shafts 69' journaled in bearings 70' of double bearing brackets 71'. Gears 75' are mounted on the shafts 69' and are meshed with pinions 76' mounted on a drive shaft 77' which is journaled in bearings 78' of the brackets 71'.

A loose shaft 79 mounted intermediate the drive shafts 77 and 77' has a fast pulley 80 secured thereon and which is driven by a belt 81 which in turn is driven by suitable driving means. Clutch members or teeth 82 are provided on each side of the hub of the pulley for receiving clutches 83 and 83' which are slidably mounted on the drive shafts 77 and 77' respectively, Fig. 5.

Each sliding clutch has an encircling band 84 to which is pivoted a lever 85 on one side and a double arm lever 86 on the other side. Both levers are mounted on a shaft 87 journaled in a bearing 88 of a support 89. The opposite end of the double arm lever 86 has one end of a rod 90 pivoted therein, the other end of which is pivoted in the end of a lever 91 mounted on a shaft 92 disposed longitudinally of the frame as a whole and supported intermediate the upper rear and the upper front cross beams in bearings 93. Handles 94 (Fig. 12) secured to the forward ends of each shaft 92 serves to separately actuate said shafts, thereby engaging the clutches and causing the carriers to reciprocate.

Figure 5:
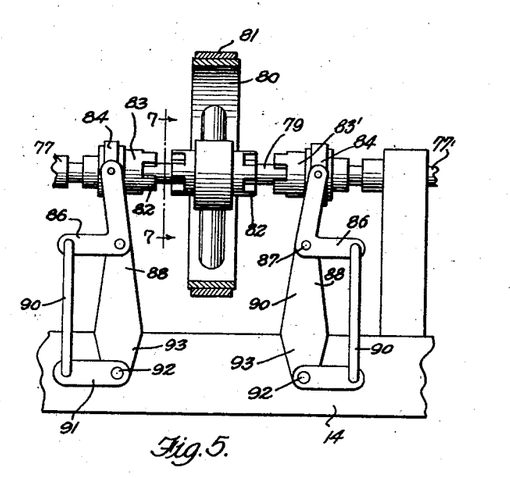
Fig. 5 is an enlarged vertical section of the driving means control.
Figure 6:
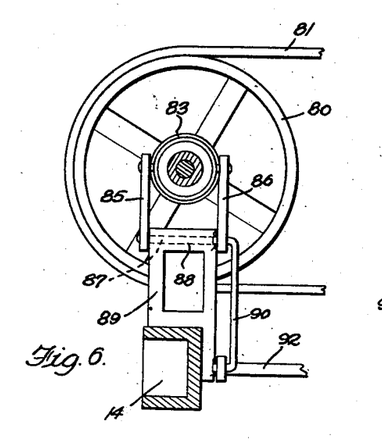
Fig. 6 is a side view of the same.
Figure 7:
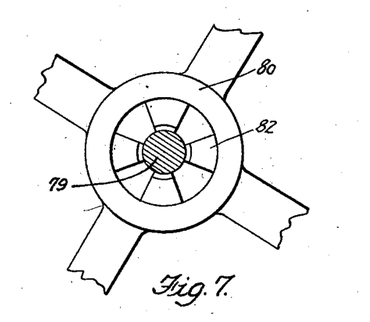
Fig. 7 is a section taken on line 7—7 of Fig. 5.
Figures 12, 13, 14, 15, 16, 17:
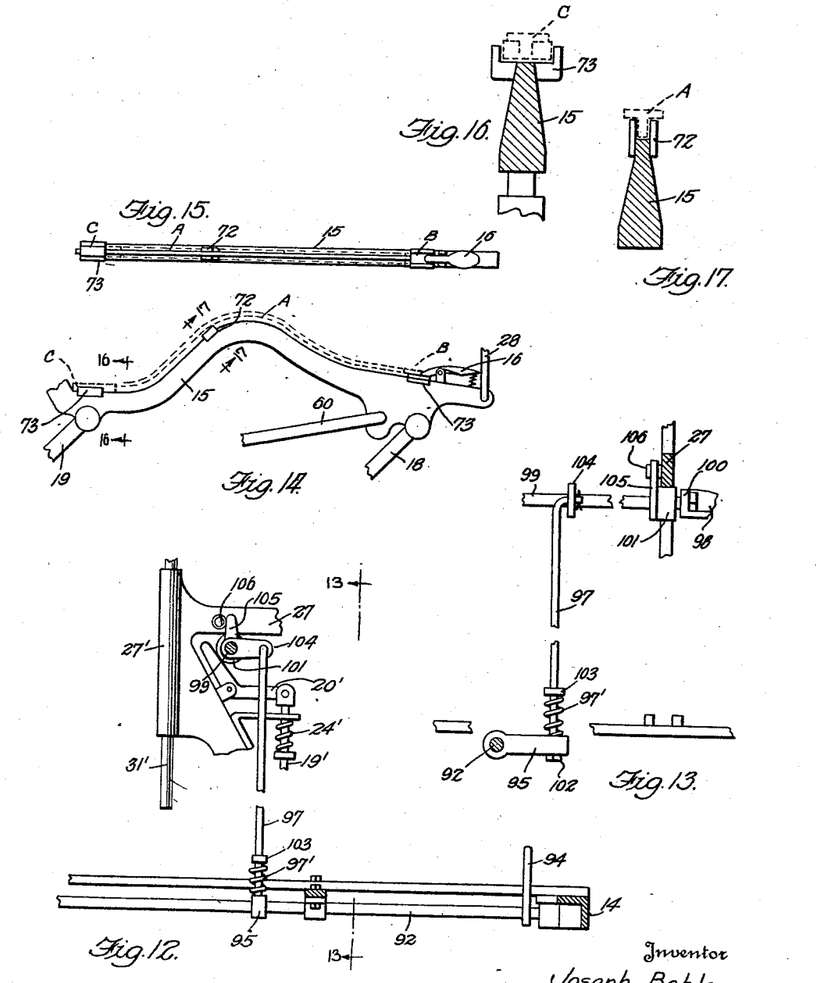
Fig. 12 is a sectional elevation showing the automatic release of the driving means control after a cycle of operations.
Fig. 13 is a sectional view taken on line 13—13 of Fig. 12.
Fig. 14 is a side elevation of the work carrier with a rib (in dotted lines) mounted thereon.
Fig. 15 is a plan view of the same.
Fig. 16 is a cross-sectional view taken on line 16—16 of Fig. 14.
Fig. 17 is a cross-sectional view taken on line 17—17 of Fig. 14.

A lever 95 mounted on the shaft 92 has the lower end of an elongated plunger 97 extending through its outer end and headed by a nut 102. A coiled spring 97' is disposed circumferentially of the plunger and is confined thereon between a washer 103 and the lever 95, thus eliminating the jerk upon the clutch when said plunger is suddenly thrust downwardly. The upper end of the plunger is hinged in the outer end of a lever 104 which is secured on the shaft 99. Another lever 105 is securely mounted on the shaft 99 adjacent the roller 101 for engaging a pin 106 in the side and at the rear of the master guide form 27 when the carrier is at its forward position, thereby automatically disengaging the clutches 83 and 83' as shown in Figs. 5, 12 and 13.

The upper arm of the double arm lever 20' of the work grip 17 is adapted to be engaged by the roller 101 when the carrier is at its forward position thereby automatically releasing the grip of the plunger 19' upon the foot C of the rib and allowing same to be removed from said carrier, as shown in Fig. 10.

Switch boxes 107 for each of the motors 52 are mounted on the lower front cross beam 14.

A rack 108 is hung from the shaft 99 with its front end braced to the upper front cross beam and is used as a holder for gin ribs.

The upper front cross beam 14 is curved rearwardly to permit access to the work holders in the use of the machine, as in Fig. 3.

Braces 109 and 110 are secured intermediate the ends of both the front arched uprights 11 and the rear arched uprights 12 respectively.

The machine has been shown as embodying two grinding units which are independently operable through the clutch connections, so that it is only necessary to describe the operation of one unit since the invention rests in the construction and assemblage thereof. This invention is particularly designed for finishing gin saw ribs which are provided with a securing heel at each end and an intermediate longitudinally curved body of less width than the heels. It therefore becomes important to guide the rib in its travel between the grinding wheels so that its curved portion will be maintained in substantial alignment with the horizontal axes of the wheels, and to adjust such wheels to gage the width of the curved portion while effecting their separation at each end of the carrier travel to provide for the greater width of the heel portions.

With the rib clamped upon the work holder 15, and the parts in the position shown in Fig. 2, the weight of this holder and guide 27 is partially counterbalanced so that the guide will travel upon the roller 101 on the fixed standard. The unbalanced weight of the parts causes this guide to impart the irregular vertical movement to the holder so that the faces of the rib to be finished are held in alignment with the peripheries of the wheels at their nearest point of approach. This point is regulated by the adjustment at 44 to gage the exact width of the rib at its curved portion.

The driving chain by its connection with the carrier causes it to travel toward the right from the position in Fig. 2, and as the limit of such travel is reached the rolls 48 engage the form 34 on the carriage and forcibly separate the wheels as they reach the heel portion of the rib. Continued movement of the chain causes a return of the carrier to initial position, as in Fig. 2, where the wheels are similarly separated. When reaching this position, the shaft 99 is partially rotated, by the means shown in Figs. 5, 12 and 13, so as to automatically release the clutch for the carrier drive and also withdraw the holding pin at the inner heel of the rib so that the outer clamp 16 may be manually released and the rib easily removed from the curved support.

By vertically adjusting the work during its passage in contact with the grinding wheels the sides of a curved object may be kept in such alignment with the axes of the wheels as to assure the most efficient grinding and accurate gaging of the surfaces ground. This is facilitated by partially counterbalancing the weight of the parts so that the form or guide when traversing the roll is released of much of the weight and a more accurate movement thereof effected. Likewise the grinding wheels are set at an adjustment to determine their point of closest approach, and are also adapted to be bodily shifted therefrom at certain periods of the carrier travel.

While the specific construction of the several elements of the machine has been shown and described, the invention is not confined thereto, as changes and alterations may be made therein without departing from the spirit of the invention as recited in the following claims.

What I claim is:—

1. In a grinding machine, a frame, a trackway supported thereby, a carrier slidable upon said trackway, a work holder beneath the carrier and connected for movement therewith and for relative vertical adjustment, a guide form connected to the work holder, a fixed contact with the frame engaging said form, means for reciprocating the carrier, and grinding wheels disposed at opposite sides of the work holder.

2. The combination as defined by claim 1, with means for counterbalancing a portion of the weight of the work holder and guide form.

3. The combination as defined by claim 1, arms extending from said wheels into alignment with said carrier, and cam faces upon the carrier disposed to shift said arms laterally thereof.

4. The combination defined by claim 1 with clamping means at the opposite ends of the work holder, and means actuated by the fixed contact for releasing one of said clamping means.

5. In a grinding machine, a frame, a trackway supported thereby, a carrier slidable upon said trackway, a work holder beneath the carrier and connected for movement therewith and for relative vertical adjustment, a guide form connected to the work holder, a fixed contact with the frame engaging said form, means for reciprocating the carrier, a pivoted yoke carrying a grinding wheel rotating in a plane at an angle to the travel of the work holder, means for adjusting said yoke relative to said holder, a supplemental cooperating yoke having a shifting arm, and means upon the carrier for engaging said arm to shift the wheel away from the work holder.

6. In a grinding machine, a frame, a reciprocating carrier mounted thereon and provided with a work holder, an endless driving chain, and a pitman connection from said chain to the work holder.

7. The combination defined by claim 6, with clutched driving means for said chain, and means actuated by said carrier at one end of its travel for disconnecting said driving means.

8. In a grinding machine, a frame, a reciprocating carrier mounted thereon, a work holder and guide having sliding vertical adjustment upon said carrier, supporting links extending from the work holder to a connector, and a counterbalanced lever for supporting said connector.

9. In a grinding machine, a frame, a reciprocating carrier mounted thereon, a work holder and guide having vertical sliding adjustment upon said carrier, supporting links pivoted to the work holder and to a connector, a counterbalancing device, a bar pivoted to said device and connector, a link pivoted to the connector and a fixed part, means for reciprocating the work holder, and grinding wheels disposed at opposite sides of said holder.

10. The combination defined by claim 9 with means engaging the guide for adjusting the holder vertically of its path of reciprocation, and means upon the carrier for shifting said grinding wheels lateral of said path.

11. The combination defined by claim 9 with a clutched driving gear for the reciprocating means, a countershaft controlling the clutch of said gear, and a leverage connection from said countershaft disposed to be actuated by the carrier at one limit of its travel to disconnect the driving power.

12. In a grinding machine, a frame, a supporting rail, a carrier slidably mounted on said rail and having a depending hanger, a combined work holder and substantially parallel guides slidably mounted upon said hanger, a standard having a roller traversing said guide, and means for reciprocating said carrier and parts carried thereby.

13. The combination defined by claim 12 with a vertical post from the forward end of the guide sliding in the carrier, and an offset connection between the holder and guide at said forward end.

14. In a grinding machine, a frame, a carrier mounted to reciprocate, a work holder supported by the carrier, grinding wheels at opposite sides of said holder, a manual work clamp at one end of the holder, an automatic work clamp at the opposite end thereof, and a connection from the carrier disposed to release the automatic clamp at one limit of the carrier travel.

15. In a grinding machine, a base, parallel reciprocating work holders mounted thereon, grinding wheels at the opposite sides of each holder rotating in a plane at an angle to its reciprocation, an independent motor for each wheel, a master gear, separate driving means for the work holders having clutched connection with said gear, a work tray intermediate the work holders, and a recessed portion of said base at the end adjacent said tray.

16. In a grinding machine, a work carrier, opposite grinding wheels mounted to rotate at an angle to the carrier travel, means for reciprocating the carrier between the wheels, and means for automatically releasing the work from the carrier at one end of the travel thereof.

17. In a grinding machine, a work carrier, opposite grinding wheels mounted to rotate at an angle to the carrier travel, means for reciprocating the carrier between the wheels, means for separating the grinding wheels laterally of the carrier at each end of the travel thereof, and means for disconnecting the reciprocating means at the completion of a reciprocation of the carrier.

In testimony whereof I affix my signature.

JOSEPH BEHLE.